United States Patent [19]

Tsuchiya et al.

[11] 4,335,953
[45] Jun. 22, 1982

[54] VARIABLE MAGNIFICATION COPYING APPARATUS

[75] Inventors: Hiroaki Tsuchiya, Tokyo; Ikuo Soma, Yokohama, both of Japan

[73] Assignee: Canon Kabushiki Kaisha, Tokyo, Japan

[21] Appl. No.: 212,446

[22] Filed: Dec. 3, 1980

[30] Foreign Application Priority Data

Dec. 12, 1979 [JP] Japan .................................. 54/161185

[51] Int. Cl.³ ........................ G03G 15/28; G03G 15/00
[52] U.S. Cl. ............................ 355/14 CH; 355/3 CH; 355/57; 355/8
[58] Field of Search ................. 355/14 CH, 3 CH, 55, 355/56, 14 R, 3 R, 57, 8

[56] References Cited

U.S. PATENT DOCUMENTS

| | | | |
|---|---|---|---|
| 3,778,147 | 12/1973 | Reehil et al. | 355/57 X |
| 4,003,650 | 1/1977 | Courtney et al. | 355/14 CH X |
| 4,167,325 | 9/1979 | Plumadore | 355/14 CH |
| 4,192,609 | 3/1980 | Tani et al. | 355/57 X |
| 4,209,248 | 6/1980 | Gibson et al. | 355/8 |

*Primary Examiner*—Arthur C. Prescott
*Attorney, Agent, or Firm*—Fitzpatrick, Cella, Harper & Scinto

[57] ABSTRACT

The ratio of the length of the light path between an original to be copied and a lens to the length of the light path between the lens and a photosensitive medium is changed by the copying magnification changing operation. That is, for example, the lens is brought nearer to the photosensitive medium. After this magnification changing operation, a reference light is thrown upon the photosensitive medium through the lens. The potential of the area of the photosensitive medium illuminated by the reference light is detected, and the output of photosensitive medium charging means is controlled correspondingly to that potential.

28 Claims, 6 Drawing Figures

VARIABLE MAGNIFICATION COPYING APPARATUS

BACKGROUND OF THE INVENTION

1. Field of the Invention

This invention relates to a variable magnification copying apparatus using an electrophotographic photosensitive medium.

2. Description of the Prior Art

In a variable magnification copying apparatus, the imaging magnification of an original image is changed by changing the ratio of the length of the forward light path of a lens to the length of the rearward light path of the lens. (For example, U.S. Pat. Nos. 3,542,467; 3,614,222 and 4,116,561).

When the imaging magnification is changed, the density of a light beam on a photosensitive medium varies even if a light beam of the same density is incident on the lens. In other words, the exposure amount of the photosensitive medium varies about the imaging magnification. To meet such inconvenience, there are U.S. Pat. No. 3,917,393, U.S. Application Ser. No. 138,981 now U.S. Pat. No. 4,264,198 (corresponding DT-OS No. 2839240), etc. The former discloses a technique of varying the incidence angle of the light beam with respect to a slit of fixed width in accordance with a selected magnification. However, the rate of variation in exposure amount corresponding to the variation in magnification is not simple, and such slit cannot accomplish sufficient correction of the quantity of light. In the case of the latter, the iris diaphragm of the lens is adjusted with a change of the magnification. However, this iris diaphragm is also used to adjust the image density as the operator likes. Accordingly, a complicated mechanism becomes necessary which prevents the diaphragm adjusting operation accompanying a magnification change from affecting a density adjusting dial. Also, by a mechanical diaphragm, it is considerably difficult to maintain the exposure amount of the photosensitive medium constant irrespective of a magnification change.

SUMMARY OF THE INVENTION

It is an object of the present invention to provide an improved variable magnification copying apparatus.

It is another object of the present invention to provide an improved variable magnification copying apparatus which can prevent fluctuation of the image density even if the copying magnification is changed.

The variable magnification copying apparatus of the present invention is provided with means for irradiating a photosensitive medium with a reference light through a lens after the imaging magnification of an optical system has been changed. Since the reference light is thrown upon the photosensitive medium through the lens, the exposure amount of the reference light on the photosensitive medium correponds to the relative position of the lens in the optical system, in other words, the imaging magnification of the optical system. On the other hand, the potential of the photosensitive medium after being irradiated with the light corresponds to the output of charge supply means for the photosensitive medium and the exposure amount. Therefore, in the present invention, the potential of the area of the photosensitive medium irradiated with the reference light through said lens is detected and the output of the charge supply means is controlled on the basis of this potential information. Thus, according to the present invention, the latent image potential can be exactly brought to the target potential even if the magnification is changed. In other words, the copy image density can be exactly maintained at the target density even if the magnification is changed.

The technique of controlling the output of the charge supply means is disclosed in U.S. Pat. No. 3,788,739, etc., but this prior art suggests nothing about irradiating the photosensitive medium with a reference light through a lens in a variable magnification copying apparatus.

Other objects and features of the present invention will become apparent from the following detailed description taken in conjunction with the accompanying drawings.

DESCRIPTION OF THE PREFERRED EMBODIMENTS

Figure 1:
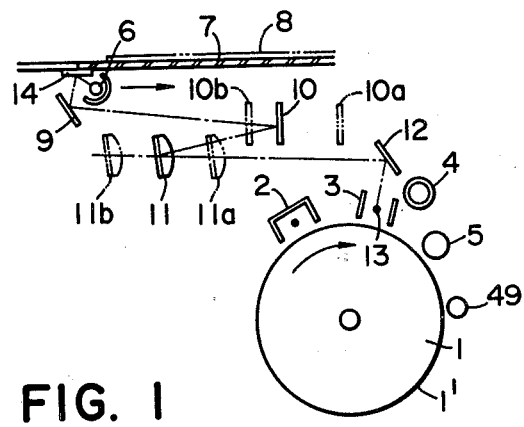
FIG. 1 illustrates an embodiment of the present invention.

Referring to FIG. 1, an original 8 to be copied is placed on a fixed original carriage 7 forming an original supporting surface. This original is illuminated by an illuminating lamp 6 and scanned by a first mirror 9 moved with the lamp 6 in a direction parallel to the carriage 7 and a second mirror 10 moved in the same direction at $\frac{1}{2}$ of the velocity of the first mirror 9. During the time other than the magnification changing operation, the image of the original thus scanned is formed on the photosensitive medium 1' of a drum 1 rotated in the direction of the arrow, by a fixed in-mirror type imaging lens 11. That is, the image of the original is slit-projected upon the photosensitive medium 1' at an exposure station 13. Disposed between the lens 11 and the photosensitive medium 1' is a fixed mirror 12 for bending the image projection light path. The peripheral surface of the drum 1 is formed by the electrophotographic photosensitive medium 1' which comprises an electrically grounded conductive layer, a photoconductive layer and a transparent surface insulating layer. With the rotation of the drum 1, corona discharge from a DC corona discharger 2 is applied to the surface of the photosensitive medium 1' to uniformly charge said surface. The discharge polarity of the discharger 2 is positive when said photoconductive layer is N type, and negative when said photoconductive layer is P type. Next, when the drum comes to the exposure station 13, the optical image of the original 8 is slit-projected upon the surface of the photosensitive medium 1' as previously described while, at the same time, a discharging corona discharge is applied to the surface of the photosensitive medium by a corona discharger 3. The discharger 3 is an AC corona discharger or a DC corona discharger opposite in polarity to the discharger 2 and, in any case, due to the actions of the dischargers 2 and 3 and the projection of said optical image, a potential pattern corresponding to the original is formed on the photosensitive medium 1'. Subsequently, the photosensitive medium 1' is uniformly illuminated by a lamp 4, whereby said potential pattern is converted into an electrostatic latent image having a high contrast. The application of the discharge from the discharger 3 to the photosensitive medium 1' may take place before the projection of said optical image. In this case, the lamp 4 is unnecessary.

The present invention is also applicable to a variable magnification copying apparatus using a so-called two-layer photosensitive medium comprising a conductive layer and a photoconductive layer and having no transparent surface insulating layer. In that case, the discharger 3 and the lamp 4 are unnecessary.

In any case, the electrostatic latent image is developed by a well-known technique, and the developed image is transferred to paper, and the transferred image is fixed on the paper. On the other hand, after the image transfer, the photosensitive medium is cleaned for reuse.

Now, the lens 11 is disposed at its solid-line position during one-to-one magnification copying, at a position 11a during reduction copying, and at a position 11b during enlarged copying. The forward movement starting points of the mirror 9 and lamp 6 are the solid-line positions of FIG. 1 during the copying at any magnification, but the forward movement starting point of the mirror 10 is the solid-line position during one-to-one magnification copying, a position 10a during reduction copying, and a position 10b during enlarged copying. The mirror 9 and lamp 6 move rightwardly from said forward movement starting points and the mirror 10 moves rightwardly from its forward movement starting point corresponding to the magnification selected, to thereby scan the original and, when the scanning of the original is terminated, they move backwardly, namely, in the direction opposite to the direction of forward movement, and return to their respective forward movement starting points. The lamp 6, mirror 9 and mirror 10 begin to scan the original 8 at a point of time whereat they have moved over respective predetermined distances after they have started their forward movement from their respective forward movement starting points.

Changing the position of the lens 11 by the magnification changing operation as described and changing the forward movement starting point of the mirror 10 permits changing the ratio of the length of the forward light path of the lens to the length of the rearward light path of the lens so that the original image at a selected magnification is formed on the photosensitive medium. The forward light path of the lens refers to the light path between the original and the lens. That is, the light path on the object space side, and the rearward light path of the lens refers to the light path between the lens and the photosensitive medium, in other words, the light path on the image space side. Of course, the image of the original is projected upon the photosensitive medium through these two light paths.

Figure 2:
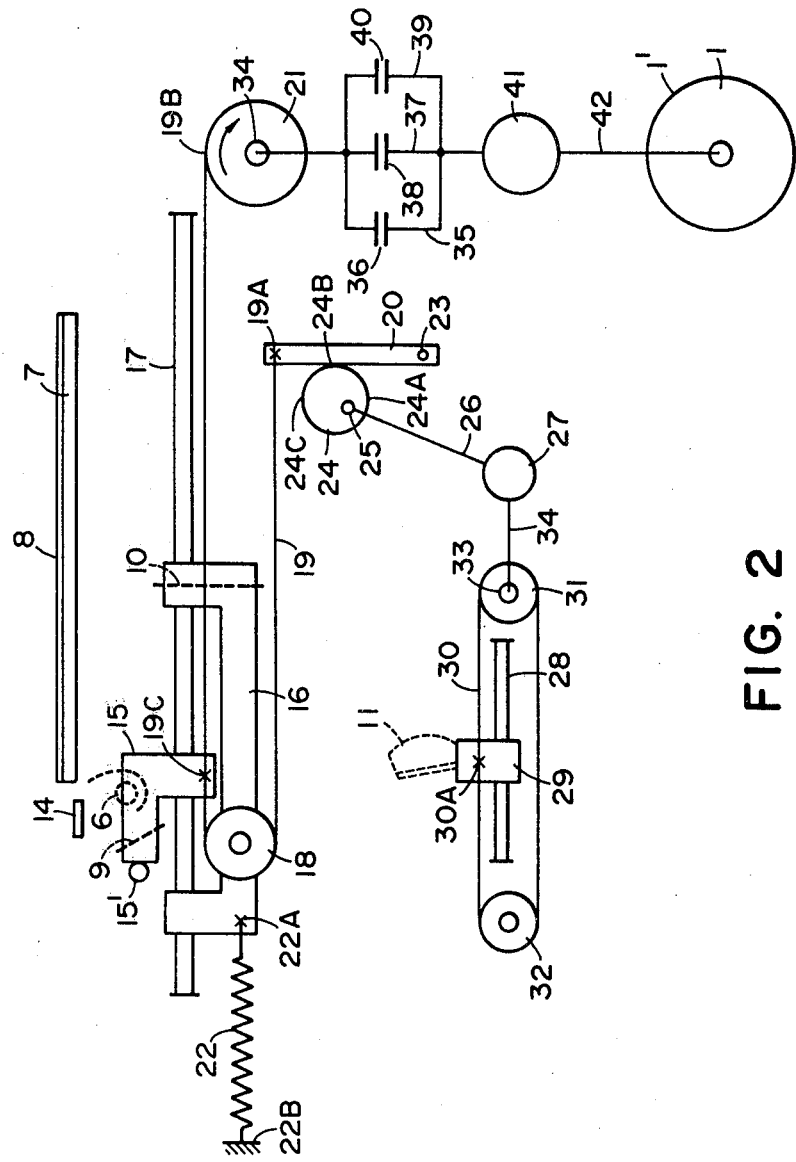
FIG. 2 is an illustration of a magnification changing mechanism.

Referring to FIG. 2, the lamp 6 and mirror 9 are supported by a first carriage 15, and the mirror 10 is supported by a second carriage 16. The carriages 15 and 16 are slidably supported on a guide bar 17 parallel to the original carriage 7. Designated by 18 is a pulley rotatably supported on the second carriage 16, and a wire 19 having one end 19A secured to an arm member 20 is passed over the pulley 18. The other end 19B of the wire 19 is secured to a drive pulley 21. The wire 19 in the portion between the pulleys 18 and 21 is secured to the first carriage 15. One end 22A of a spring 22 having the other end thereof secured to an immovable member in the body of the copying apparatus is engaged with the second carriage 16. Thus, the carriage 16 is normally biased resiliently in the direction opposite to the direction of forward movement of the mirrors by the spring 22.

The arm 20 is pivotably supported on a shaft 23. The arm 20 is normally biased resiliently in counter-clockwise direction by the action of said spring 22. By this resilient force, the arm 20 bears against a cam 24. The rotary shaft 25 of the cam 24 is connected to a motor 27, rotatable in both normal and reverse directions, by a chain sprocket mechanism 26.

The lens 11 is fixed to a third carriage 29 slidably supported on a rail 28. A portion 30A of the endless wire 30 is secured to the carriage 29. The endless wire 30 is passed over pulleys 31 and 32. The rotary shaft 33 of the pulley 31 is connected to the motor 27 by a chain sprocket mechanism.

By the magnification changing operation, the motor 27 is rotated in a direction corresponding to the selected magnification, by a number of revolutions corresponding to the selected magnification. The rotation of this motor 27 is transmitted to the cam 24 by the chain sprocket mechanism 26. The cam 24 is rotated through an angle corresponding to the selected magnification. The cam is rotated so that when one-to-one magnification copying is selected, the cam surface 24B bears against the arm 20, while when enlarged copying is selected, the cam surface 24A bears against the arm 20, and when reduction copying is selected, the cam surface 24C bears against the arm 20. The arm 20 pivots in accordance with the cam surface which bears thereagainst, thereby displacing the wire end 19A. By this, the forward movement starting point of the mirror 10 is selectively changed to the position 10 or 10a or 10b of FIG. 1. On the other hand, the rotation of said motor 27 is transmitted to the pulley 31 through a chain sprocket mechanism 34, whereby the pulley 31 is rotated through an angle corresponding to the selected magnification. Accordingly, the lens 11 is selectively displaced to the position 11 or 11a or 11b of FIG. 1 by the wire 30.

When the displacement of said mirror 10 and lens 11 is terminated and the later described output control of the dischargers 2 and 3 is terminated, the pulley 21 is driven. That is, the rotary shaft 34 of the pulley 21 is connected to a motor 41 by a first mechanism comprising a gear train 35 and a clutch 36, a second mechanism comprising a gear train 37 and a clutch 38, and a third mechanism comprising a gear train 39 and a clutch 40. The first, the second and the third mechanism are provided parallel to one another. The gear ratio of the gear train 35, the gear ratio of the gear train 37 and the gear ratio of the gear train 39 differ from one another. Thus, the clutch 36 is operated during one-to-one magnification copying, the clutch 38 is operated during enlarged copying, and the clutch 40 is operated during reduction copying. By this, the pulley 21 is rotatively driven at a speed corresponding to the selected magnification and the pulley 21 moves the mirror 9, lamp 6 and mirror 10 forward. If the peripheral velocity of the photosensitive medium is v for any magnification, the forward movement velocity of the mirror 9 and lamp 6 is v/m and the forward movement velocity of the mirror 10 is v/2m. (m is the selected magnification.) The peripheral velocity v of the photosensitive medium may also be varied in accordance with the magnification and in that case, the relative velocity between the photosensitive medium and the mirror 9 and the lamp 6 is varied so that the relation $v/v'=m$ is established between the forward movement velocities $v'$ and $v$ of the mirror 9 and lamp 6. The velocity of the mirror 10 is $v'/2$. (This is to maintain the length of the light path between the original and the lens constant during the scanning of the original so that the velocity of the mirror 10 is one half of the velocity of the mirror 9.) When the lamp 6 and the mirrors 9 and 10 are thus moved forward or rightward and the scanning of the original is terminated, the clutch operated in accordance with the selected magnification becomes inoperative and the first and second carriages 15 and 16 are returned to their respective forward movement starting points by the force of the spring 22 elongated during the forward movement of the second carriage 16. That is, the lamp 6 and the mirrors 9 and 10 are returned to the respective forward movement starting points. Designated by 15' is a stopper for preventing the first carriage 15 from moving leftward from its forward movement starting point. Also, by the action of this stopper 15', the mirror 10 is prevented from moving leftward from its selected forward movement starting point.

The drum 1 is connected to the motor 41 by a chain sprocket mechanism 42. The drum 1 is rotated during the rotation of the motor 41.

Figure 3:
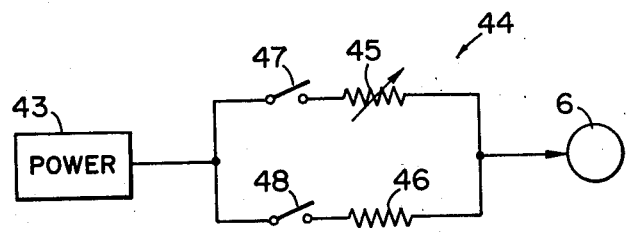
FIG. 3 illustrates means for turning on a lamp.

In FIG. 3, the power applied from a power source 43 to the lamp 6 is adjusted by adjust means 44. The adjust means 44 has a variable resistor 45 and a resistor 46 whose resistance value is fixed. Change-over switches 47 and 48 are provided between the two resistors 45, 46 and the power source 43. During the copying operation, namely, when the mirrors 9, 10 and lamp 6 are moved forward as previously described, the switch 47 is closed and the switch 48 is opened, but when the outputs of the corona dischargers 2 and 3 are controlled by the magnification changing operation as later described, the switch 47 is opened and the switch 48 is closed. The ON-OFF change-over of the switches 47 and 48 may be manually effected by the operator or may be controlled by a microcomputer or the like in relation to the other operation of the copying apparatus. In any case, when the switch 47 is closed, power is applied to the lamp 6 through the variable resistor 45. The resistance value of the variable resistor 45 is adjusted to a desired value by the operator, whereby the quantity of light emitted from the lamp 6 and accordingly, the quantity of light illuminating the original is adjusted. This adjustment is effected to adjust the density and contrast of the copy image to a desired level in accordance with the density and contrast of the original. On the other hand, when the switch 48 is closed, power is applied to the lamp 6 through the resistor 46. Thereby, the quantity of light emitted from the lamp 6 becomes equal for any copying magnification selected. The resistance value of the resistor 46 is set so that the quantity of light emitted from the lamp 6 is suitable for illuminating a standard white ground original.

Now, in FIG. 1, reference numeral 14 designates a white reflecting plate having a diffusing-reflecting property equivalent to that of the standard white ground original. In some cases, the reflecting plate 14 may be colored or may have a strong regular reflection characteristic. The reflecting plate 14 is disposed so that the mirror 9, when at its forward movement starting point, is opposed thereto. The light emitted from the lamp 6 is reflected by the reflecting plate 14, and then passes via the mirrors 9, 10 and through the lens 11 and via the mirror 12. That is, it passes along the original image projecting light path and impinges on the photosensitive medium 1' at the exposure station 13. The reflecting plate 14 should preferably be disposed at such a position that the length of the light path between the photosensitive medium 1' and the reflecting plate 14 is substantially equal to the length of the light path between the photosensitive medium 1' and the original 8. Thus, the image of the reflecting plate 14 is projected upon the photosensitive medium 1' at a selected magnification. When the reflecting plate 14 is at a position corresponding to the underside position of the original carriage 7 as shown, the reflecting plate 14 is not at a position of an optically exact equivalent to the original 8 and therefore, the image of the reflecting plate 14 is more or less out of focus, but this results in no practical disadvantage.

In FIG. 1, reference numeral 49 designates a surface potential detector. The detector 49 is opposed to the photosensitive medium 1' at the position immediately after it is illuminated by the whole surface exposure lamp 5, and generates a signal corresponding to the surface potential of the photosensitive medium 1'. This signal is used to control the outputs of the corona dischargers 2 and 3. That is, the amount of discharge applied to the photosensitive medium 1' is controlled.

Figure 4:
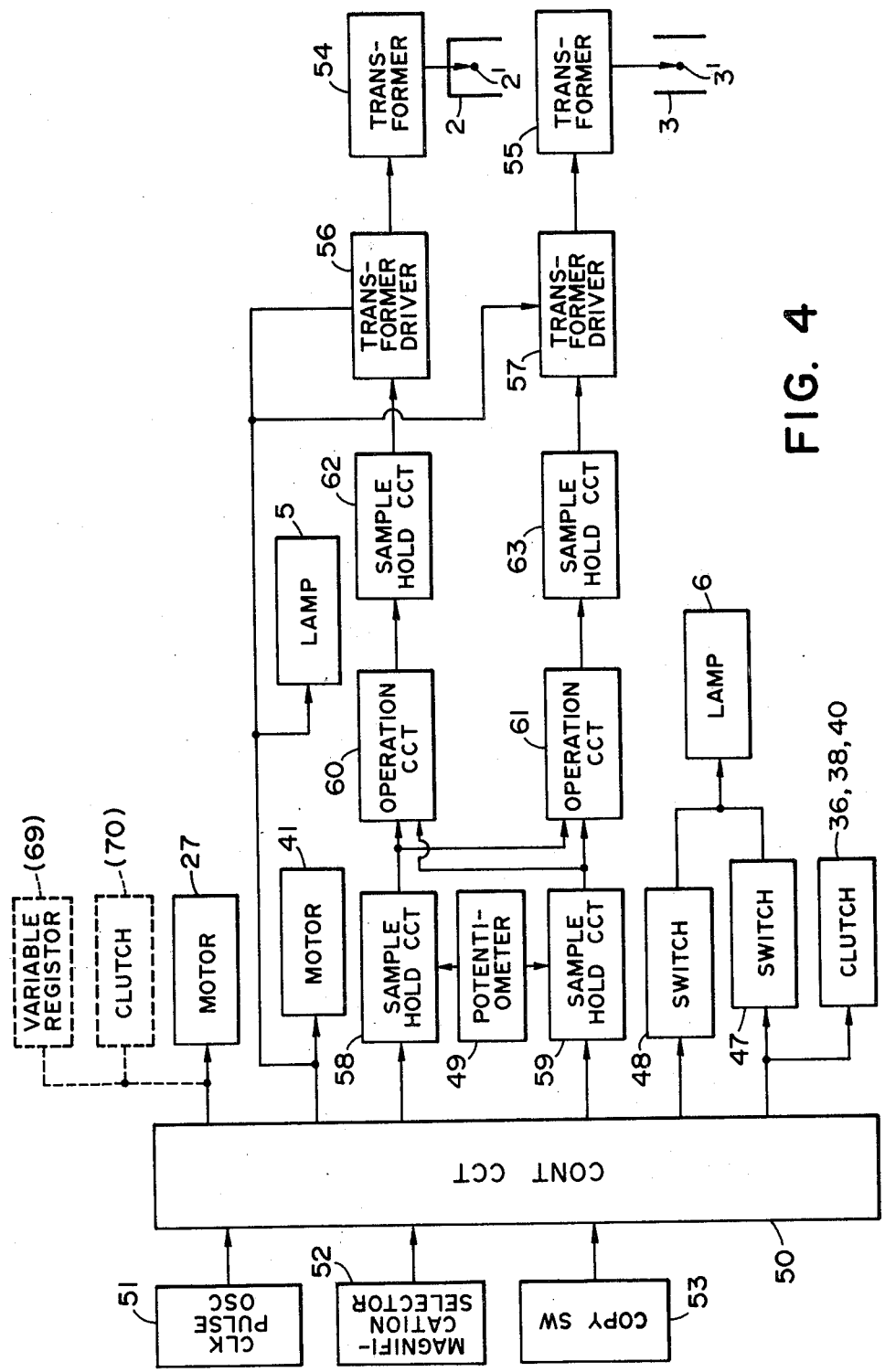
FIG. 4 is an illustration of control means.

Referring to FIG. 4, a control circuit 50 counts the clock pulses of a clock pulse oscillator 51 and controls the operation timing of the copying apparatus. When a magnification selector switch 52 is closed and then a copy switch 53 is closed, the control circuit 50 first commands the rotation of the magnification changing motor 27 (time $t_1$). By this, the position of the lens 11 and the forward movement starting point of the mirror 10 are changed as previously described. (For the timing of the operating signal of the apparatus, refer to FIG. 5.) Simultaneously with the initiation of said magnification changing operation, the control circuit 50 commands the operation of the driving circuit 56 of a power supply transformer 54 to the main motor 41, lamp 5 and corona discharger 2 and the operation of the driving circuit 57 of a power supply transformer 55 to the corona discharger 3. By this, the photosensitive medium 1' is rotated, and the dischargers 2 and 3 discharge and apply corona discharge to the photosensitive medium 1', and the lamp 5 is turned on to uniformly illuminate the whole surface of the photosensitive medium 1'. After said magnification changing operation has been terminated, the control circuit 50 commands the closing of the switch 48 (time $t_2$). Thus, the lamp 6 emits light at a standard brightness, as previously mentioned. The light emitted from the lamp 6 is reflected by the white reflecting plate 14 and impinges on the photosensitive medium 1' as previously described. In other words, at the exposure station 13, there is formed an optical image of the reflecting plate 14 at the selected magnification. The brightness of this optical image and accordingly, the quantity of light which the unit area of the photosensitive medium 1' receives per unit time is varied correspondingly to the selected magnification. If the area of the photosensitive medium illuminated by said light is called the light portion and the surface potential of this area is called the light portion potential $V_L$, then this light portion potential $V_L$ is of course varied correspondingly to said quantity of light.

Next, at a point of time whereat said light portion arrives at a position opposed to the detector 49 after it has been illuminated by the lamp 5, the control circuit 50 generates a $V_L$ strobe signal and applies it to a sample hold circuit 58 (time $t_3$). Thus, the light portion potential $V_L$ detected by the detector 49 is stored in a sample hold circuit 56.

In a predetermined short time after the closing of the switch 48, the control circuit 50 opens the switch 48. Accordingly, the lamp 6 is turned off and the illuminating light does not impinge upon the photosensitive medium 1' at the exposure station. The area of the photosensitive medium which is not illuminated by the light of this lamp 6 is called the dark portion, and the surface potential of this area is called the dark portion potential $V_D$. At a point of time whereat the dark portion arrives at a position opposed to the detector 49 after it has been illuminated by the lamp 5, the control circuit 50 applies a $V_D$ strobe signal to a sample hold circuit 59 (time $t_4$). Thus, the dark portion potential $V_D$ detected by the detector 49 is stored in the sample hold circuit 59.

The signals stored in said circuits 58 and 59 are applied to operational circuits 60 and 61, respectively.

The operational circuit 60 effects an operation in accordance with an equation.

$$I_{10} = \alpha_1 \cdot \Delta V_D + \alpha_2 \cdot \Delta V_L + I_{10'}$$

and puts out a signal corresponding to the value of a current to flow to the electrode 2' of the discharger 2.

Also, the operational circuit 61 effects an operation in accordance with an equation $$I_{12} = \beta_1 \cdot \Delta V_D + \beta_2 \cdot \Delta V_L + I_{12'}$$

and puts out a signal corresponding to the value of a current to flow to the electrode 3' of the discharger 3.

In the above equations, $\Delta V_D$ represents the difference between the dark portion potential which is aimed at and the dark portion potential actually detected by the potentiometer 49, and $\Delta V_L$ represents the difference between the light portion potential which is aimed at and the light portion potential actually detected by the potentiometer 49. The light portion potential which is aimed at and the dark portion potential which is aimed at are the same for any magnification. Also, $I_{10'}$ represents the standard current value which has actually flowed to the electrode 2' when the drum surface potential has been detected by the potentiometer 49, and $I_{12'}$ represents the standard current value which has actually flowed to the electrode 3' when the drum surface potential has been detected by the potentiometer 49. Also, $\alpha_1$ is the inverse number of the ratio of the variation in dark portion potential to the variation in the current flowing to the electrode 2', $\alpha_2$ is the inverse number of the rate of the variation in light portion potential to the variation in the current flowing to the electrode 2', $\beta_1$ is the inverse number of the rate of the variation in dark portion potential to the variation in the current flowing to the electrode 3', and $\beta_2$ is the inverse number of the rate of the variation in light portion potential to the variation in the current flowing to the electrode 3'.

The output signals of the operational circuits 60 and 61 are stored in sample hold circuits 62 and 63, respectively. The transformer driving circuit 56 controls the output of transformer 54 correspondingly to the signal stored in the sample hold circuit 62. Thus, a current $I_{10}$ flows to the electrode 2'. Also, the transformer driving circuit 57 controls the output of transformer 55 correspondingly to the signal stored in the sample hold circuit 63. Thus, a current $I_{12}$ flows to the electrode 3'.

Figure 5:
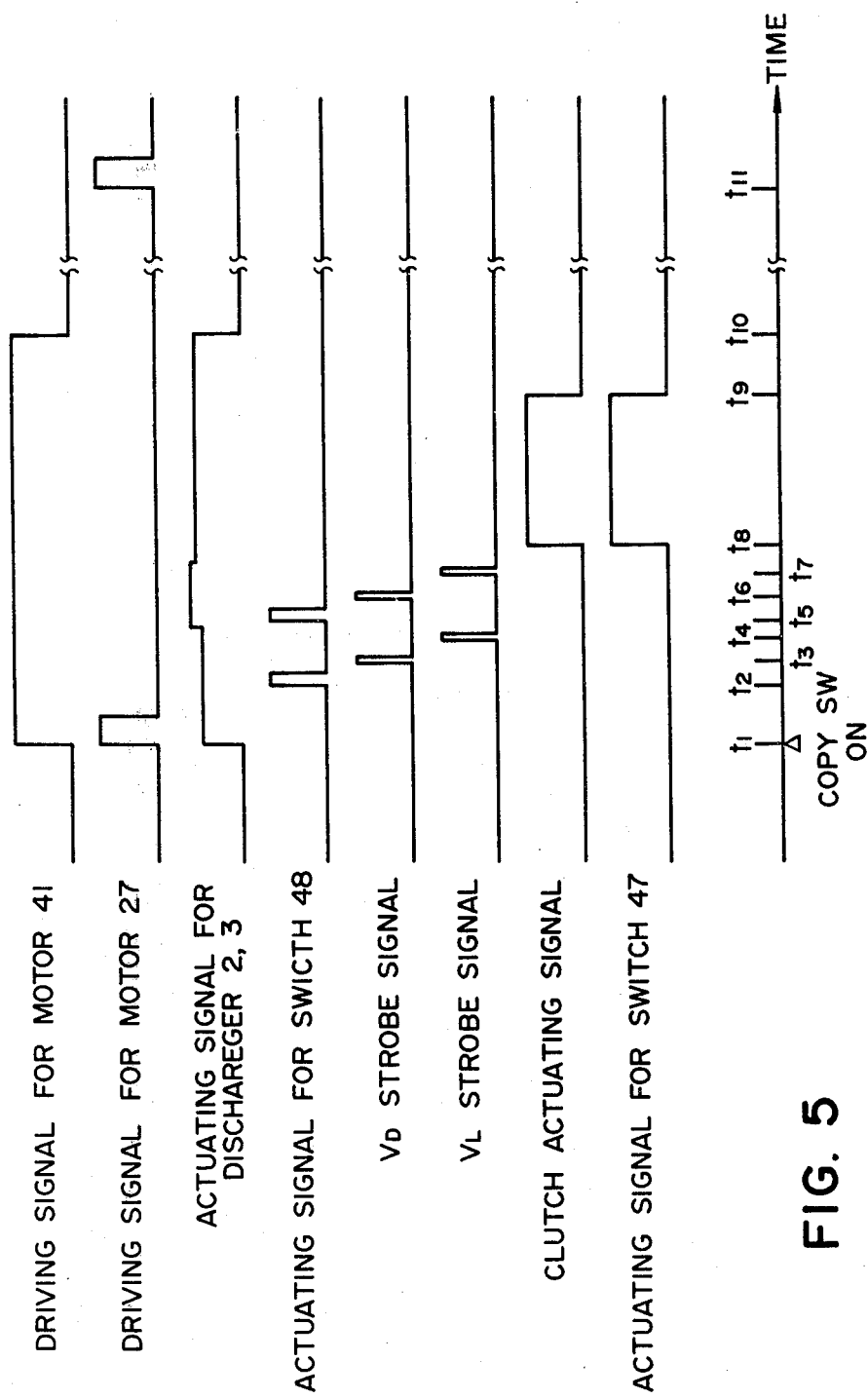
FIG. 5 illustrates the operation sequence of the apparatus.

As seen in FIG. 5, in the present embodiment, the switch 48 is closed twice at times $t_2$ and $t_5$ before the copying is started and accordingly, the above-described control of the outputs of the dischargers 2 and 3 is effected twice before the copying is started. Alternatively, this control may be effected three times or only once. In this manner, even if the projection magnification of the optical system is changed, the light portion potential and the dark portion potential may be maintained constant by controlling the outputs of the dischargers 2 and 3.

After the control of the outputs of the dischargers 2 and 3 has been terminated, the control circuit 50 operates the switch 47 and one of the clutches 36, 38 and 40, which corresponds to the selected magnification (time $t_8$). By this, the lamp 6 is turned on at a brightness adjusted by the operator and the mirrors 9, 10 and the lamp 6 start their forward movement, so that, as already described, the original 8 is scanned at a velocity corresponding to the selected magnification. Thus, the original 8 is copied at the selected magnification.

When the scanning of the original is terminated, the control circuit 50 renders one of said clutches 36, 38 or 40 and switch 47 inoperative (time $t_9$). When the switch 47 becomes inoperative, the lamp 6 is turned off and, when the clutch becomes inoperative, the lamp 6 and mirrors 9, 10 return to their respective forward movement starting points as previously described. On the other hand, the toner image formed on the photosensitive medium 1' is transferred to paper and, when the fixation of the transferred image on the paper is terminated, the control circuit 50 stops the operation of the motor 41, lamp 5 and transformer driving circuits 56, 57 (time $t_{10}$). When the copying is not resumed even if the predetermined time (about three minutes) has passed thereafter, the control circuit operates the magnification changing motor 27, thereby changing the position of the lens 11 and the forward movement starting point of the mirror 10 to positions corresponding to one-to-one magnification copying (time $t_{11}$). Even if the ratio of the lengths of the forward and rearward light paths of the lens 11 is changed and the imaging magnification is changed, reference light is projected upon the photosensitive medium through the lens 11 and the outputs of the dischargers 2 and 3 are controlled by using the potential of the photosensitive medium in the area thereof irradiated with the reference light and therefore, excellent copy may always be obtained in said apparatus.

In said apparatus, the dark portion potential $V_D$ is measured and the outputs of the dischargers 2 and 3 are controlled by using a dark portion potential signal and a light portion potential signal. Thus, very accurate control of the outputs of the dischargers 2 and 3 becomes possible, but using said dark portion potential signal is not a requisite condition. The outputs of the dischargers 2 and 3 may also be controlled by using only the light portion potential signal and, in this case, the sample hold circuit 59 is unnecessary and $\Delta V_D$ in said equations is considered to be 0.

In said apparatus, the adjustment of the amount of exposure of the original image for the photosensitive medium has been effected by the adjustment of the quantity of light emitted from the lamp 6, whereas it may also be effected by a mechanical diaphragm device. For example, in FIG. 6, reference numeral 64 designates an iris diaphragm comprising a plurality of plates disposed at the pupil position of the lens 11. The aperture diameter of the diaphragm 64 is varied by rotating an aperture ring, as is well-known, and the light having passed through the aperture impinges upon the photosensitive medium 1' and the remaining light is blocked by said plates. An endless wire 66 is passed over the aperture ring and also over a dial 67. The dial 67 is manually rotated by the operator, whereby the aperture diameter of the diaphragm becomes a desired value. In other words, the amount of exposure of the original image can be set to a desired value by the operation of the dial 67. A rotatable type variable resistor 69 is connected to the dial 67 through a gear train 68. Accordingly, the variable resistor 69 exhibits a resistance value corresponding to the amount of rotation of the dial 67 and thus, the aperture amount of the diaphragm 64. Also connected to the dial 67 is a motor 72 through a clutch 70 and a gear train 71, the motor 72 being rotatable in both normal and reverse directions. The motor 72 is controlled by a motor control circuit 73. That is, the signal from a comparator circuit 74 is applied to the motor control circuit 73. The signal from the variable resistor 69 and the signal from a reference signal generating circuit 75 are applied to the comparator circuit 74, which forms a signal corresponding to the difference between said two signals. The motor control circuit 73 rotates the motor 72 by a number of revolutions corresponding to the difference between said two signals and in a direction corresponding to the difference between said two signals. Accordingly, when the motor control circuit 73 is operated and the clutch 70 is operated, the dial 67 rotatively returns to the position of the standard density division at which the difference between said two signals becomes 0, even if it is initially adjusted to any rotational position. That is, by the operation of the motor 72 and the clutch 70, the aperture diameter of the diaphragm 64 is changed to an aperture diameter suited for copying a standard white ground original. This aperture diameter is the same for any magnification. The motor control circuit 73 and clutch 70 are operatively controlled by said control circuit 50 and by using the control signal to the magnification changing motor 27. The time required for the aperture diameter of the diaphragm 64 to restore the standard aperture diameter is sufficient within the rotation time of the motor 27.

After the control of the outputs of the dischargers 2 and 3 accompanying the magnification change has been terminated, the operator may adjust the dial 67 to a desired density division. Each density division is common for any magnifications and each density division corresponds to a predetermined diaphragm aperture diameter during any magnifications. It is therefore unnecessary to change the diaphragm aperture diameter for a certain density division each time the magnification is changed.

Figure 6:
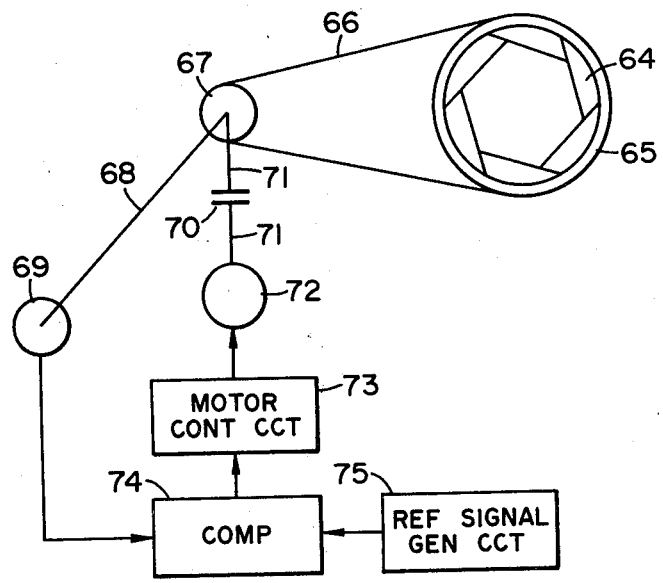
FIG. 6 illustrates an example of the mechanical diaphragm.

When the diaphragm of FIG. 6 is used, the variable resistor 45 and switch 47 of FIG. 3 are unnecessary. That is, the brightness of the lamp 6 may be the same for any magnification. In this case, for the ON-OFF control of the switch 48, the ON-OFF control signal of the switch 47 of FIG. 4 is used in addition to said signal.

As the mechanical diaphragm, use may be made of a diaphragm having a long footage of wing plate disposed in the light path and designed to adjust the position of the wing plate in the light path and, in this case, the wing plate is disposed near the exposure station 13 or near the entrance of the image projection light path.

In the above-described embodiment, the light of the original illuminating lamp is utilized as the reference light, but a light source exclusively for use as the reference light may also be provided. For example, the reflecting plate 14 may be replaced by an incandescent lamp or a fluorescent lamp. In this case, the lamp (14) is connected to the resistor 46 of FIG. 3, while the lamp 6 is connected to only the resistor 45.

Further, the adjustment of the image density may be effected by changing the target values of the light portion potential $V_L$ and dark portion potential $V_D$ by the use of a slide resistor or the like, instead of adjusting the quantity of light emitted from the lamp 6 or adjusting the mechanical diaphragm. Such changing operation is effected by the operator before the magnification changing operation, and the signals from the $V_L$ target value adjusting circuit and the $V_D$ target value adjusting circuit are applied to the operational circuits 60 and 61, respectively. In this case, the resistor 45 and switch 47 of FIG. 3 are unnecessary. The switch 48 is ON-OFF controlled by using the control signal of the switch 47 in addition to said signals. Also, the means for adjusting the diaphragm 64 of FIG. 6 is unnecessary.

Further, the ratio of the lengths of the forward and rearward light paths of the lens may be changed by moving a mirror or mirrors disposed forward and/or rearward of the lens with the lens itself fixed, or by putting in and out an auxiliary mirror forwardly and/or rearwardly of the lens.

What we claim is:

1. A variable magnification copying apparatus comprising:
   an electrophotographic photosensitive medium;
   charge supply means for supplying charge to said photosensitive medium;
   lens means for forming the image of an original to be copied on said photosensitive medium, the image of the original being projected upon said photosensitive medium through a first light path portion which is the forward light path of said lens means and a second light path portion which is the rearward light path of said lens means;
   magnification changing means for changing the ratio of the length of said first light path portion to the length of said second light path portion correspondingly to a selected magnification;
   illuminating means for illuminating said photosensitive medium with a reference light through said lens means after the ratio of the length of said first light path portion to the length of said second light path portion has been changed;
   detector means for detecting the potential of said photosensitive medium; and
   control means for controlling the output of said charge supply means by using the output signal of said detector means corresponding to the potential of the area of said photosensitive medium illuminated by said reference light.

2. An apparatus according to claim 1, wherein said illuminating means throws said reference light into said first light path portion from the starting end of said first light path portion, and said reference light passes through said first light path portion, said lens means and said second light path portion in succession to said photosensitive medium.

3. An apparatus according to claim 2, wherein said illuminating means has a light source disposed at the starting end of said first light path portion.

4. An apparatus according to claim 2, wherein said illuminating means has a light source and a reflecting surface disposed at the starting end of said first light path portion to reflect the reference light emitted from said light source so as to enter said first light path portion.

5. An apparatus according to claim 4, wherein said reflecting surface diffuse-reflects said reference light.

6. An apparatus according to claim 5, wherein said reflecting surface is white.

7. An apparatus according to claim 4, 5 or 6, wherein said light source serves also as a light source for illuminating the original.

8. An apparatus according to any of claims 1 to 6, further comprising:
   exposure amount adjust means for limiting a light beam and adjusting the exposure amount of the original image to said photosensitive medium, said exposure amount adjust means being disposed in the optical path between the starting end of said first light path portion and the terminal end of said second light path portion; and
   means for setting the adjust amount of said exposure amount adjust means to a predetermined adjust amount irrespective of the selected magnification when said reference light illuminates said photosensitive medium.

9. An apparatus according to claim 7, further comprising:
   exposure amount adjust means for limiting a light beam and adjusting the exposure amount of the original image to said photosensitive medium, said exposure amount adjust means being disposed in the light path between the starting end of said first light path portion and the terminal end of said second light path portion; and
   means for setting the adjust amount of said exposure amount adjust means to a predetermined adjust amount irrespective of the selected magnification when said reference light illuminates said photosensitive medium.

10. An apparatus according to claim 7, further comprising:
    exposure amount adjust means for adjusting the quantity of light emitted from said light source and adjusting the exposure amount of the original image to said photosensitive medium; and
    means for setting the quantity of light emitted from said light source to a predetermined quantity of light irrespective of the selected magnification when said reference light illuminates said photosensitive medium.

11. A variable magnification copying apparatus comprising:
    an electrophotographic photosensitive medium;
    charge supply means for supplying charge to said photosensitive medium;
    lens means for forming the image of an original to be copied on said photosensitive medium;
    magnification changing means for changing the imaging magnification of said lens means;
    illuminating means for illuminating said photo-sensitive medium with a reference light after the imaging magnification changing operation by said lens means and before the image of the original is projected upon said photosensitive medium;
    detector means for detecting the potential of said photosensitive medium; and
    control means for controlling the output of said charge supply means by using the output signal of said detector means corresponding to the potential of the area of said photosensitive medium illuminated by said reference light and the output signal of said detector means corresponding to the potential of the non-illuminated area of said photosensitive medium.

12. An apparatus according to claim 11, wherein said illuminating means throws said reference light into a light path having said lens means from the starting end of said light path.

13. An apparatus according to claim 12, wherein said illuminating means has a light source disposed at the starting end of said light path.

14. An apparatus according to claim 12, wherein said illuminating means has a light source and a reflecting surface disposed at the starting end of said light path to reflect the reference light emitted from said light source so as to enter said light path.

15. An apparatus according to claim 14, wherein said reflecting surface is a white surface which diffuse-reflects said reference light.

16. An apparatus according to claim 14 or 15, wherein said light source serves also as a light source for illuminating the original.

17. An apparatus according to any of claims 11 to 15, further comprising:
    a movable light-intercepting member for controlling a light beam and adjusting the exposure amount of the original image to said photosensitive medium; and
    means for returning said light-intercepting member to a predetermined position irrespective of the selected magnification when said reference light illuminates said photosensitive medium.

18. An apparatus according to claim 16, further comprising:
    a movable light-intercepting member for controlling a light beam and adjusting the exposure amount of the original image to said photosensitive medium; and
    means for returning said light-intercepting member to a predetermined position irrespective of the selected magnification when said reference light illuminates said photosensitive medium.

19. An apparatus according to claim 16, further comprising:
    exposure amount adjust means for adjusting the quantity of light emitted from said light source and adjusting the exposure amount of the original image to said photosensitive medium; and
    means for setting the quantity of light emitted from said light source to a predetermined quantity of light irrespective of the selected magnification when said reference light illuminates said photosensitive medium.

20. A variable magnification copying apparatus comprising:
    an electrophotographic photosensitive medium;
    discharging means for applying discharge to said photosensitive medium;
    light source means for illuminating an original to be copied;
    lens means for forming the image of the original on said photosensitive medium;
    magnification changing means for changing the ratio of the lengths of the forward and rearward light paths of said lens means correspondingly to a selected magnification;

light directing means for directing the light emitted from said light source means as a reference light to said lens means after the ratio of the lengths of the forward and rearward light paths of said lens means has been changed and before the image of the original is projected upon said photosensitive medium, said reference light passing through said lens means to said photosensitive medium;

detector means for detecting the potential of said photosensitive medium;

control means for controlling the output of said discharging means by using the output signal of said detector means corresponding to the potential of the area of said photosensitive medium illuminated by said reference light;

exposure amount adjust means for adjusting the input to said light source means to adjust the exposure amount of the original image to said photosensitive medium; and means for setting the input to said light source means to a predetermined value irrespective of the selected magnification when said reference light illuminates said photosensitive medium.

21. An apparatus according to claim 20, wherein said light directing means is a diffuse-reflecting member disposed at the entrance portion of the image projecting light path.

22. An apparatus according to claim 20 or 21, wherein said control means controls the output of said discharging means by using the output of said detector means corresponding to the potential of the area of said photosensitive medium illuminated by said reference light and the output of said detector means corresponding to the potential of the area of said photosensitive medium not illuminated by said reference light.

23. A variable magnification copying apparatus comprising:

an electrophotographic photosensitive medium;

charge supply means for supplying charge to said photosensitive medium;

optical means for slit-exposing said photosensitive medium to the image of an original to be copied, said optical means having scanning means for scanning the original and lens means for forming on said photosensitive medium the image of the original scanned by said scanning means;

magnification changing means for changing the image projection magnification of said optical means;

reference light illuminating means provided so that lens means is optically opposed thereto before the original scanning by said scanning means is started, said illuminating means illuminating said photosensitive medium with a reference light through said lens means after the image magnification changing operation;

detector means for detecting the potential of said photosensitive medium; and control means for controlling the output of said charge supply means by using the output signal of said detector means corresponding to the potential of the area of said photosensitive medium illuminated by said reference light.

24. An apparatus according to claim 23, wherein said reference light illuminating means throws the reference light into a light path formed by said optical means at the entrance portion of said light path.

25. An apparatus according to claim 24, further comprising:

movable light-quantity adjust means disposed in said light path for controlling a light beam and adjusting the exposure amount of the image to said photosensitive medium; and means for setting said light-quantity adjust means to a predetermined position irrespective of the selected magnification when said reference light illuminates said photosensitive medium.

26. An apparatus according to claim 24, wherein the light source of said reference light illuminating means serves also as a light source for illuminating the original and said apparatus further comprises:

exposure amount adjust means for adjusting the quantity of light emitted from said light source and adjusting the exposure amount of the original image to said photosensitive medium; and means for setting the quantity of light emitted from said light source to a predetermined quantity of light irrespective of the selected magnification when said reference light illuminates said photosensitive medium.

27. An apparatus according to claim 23, 24, 25 or 26, wherein said control means controls the output of said charge supply means by using the output signal of said detector means corresponding to the potential of the area of said photosensitive medium illuminated by said reference light and the output signal of said detector means corresponding to the potential of the area of said photosensitive medium not illuminated by said reference light.

28. An apparatus according to claim 23, 24, 25 or 26, further comprising means for changing the relative operating velocity of said scanning means to said photosensitive medium in accordance with the selected magnification.

* * * * *